US00RE39904E

(19) United States
(12) Reissued Patent
Lee

(10) Patent Number: US RE39,904 E
(45) Date of Reissued Patent: Oct. 30, 2007

(54) COMBINED ELLIPTICAL CYCLING AND STEPPING EXERCISER

(75) Inventor: Sunny Lee, Nan-Tou Hsien (TW)

(73) Assignee: Stamina Products, Inc., Springfield, MO (US)

(21) Appl. No.: 10/957,519

(22) Filed: Oct. 4, 2004

Related U.S. Patent Documents

Reissue of:
(64) Patent No.: 6,468,184
Issued: Oct. 22, 2002
Appl. No.: 09/836,734
Filed: Apr. 17, 2001

(51) Int. Cl.
*A63B 22/00* (2006.01)
*A63B 22/12* (2006.01)
*A63B 23/04* (2006.01)
*A63B 69/16* (2006.01)

(52) U.S. Cl. ..... 482/52; 482/57; 482/51
(58) Field of Classification Search ..... 482/51–54, 482/57, 70, 79–80
See application file for complete search history.

(56) References Cited

U.S. PATENT DOCUMENTS 3,747,924 A 7/1973 Champoux
4,708,338 A 11/1987 Potts
5,135,447 A 8/1992 Robards, Jr. et al.
5,199,931 A 4/1993 Easley et al.
5,238,462 A 8/1993 Cinke et al.
5,256,117 A 10/1993 Potts et al.
5,290,211 A 3/1994 Stearns
5,299,993 A 4/1994 Habing
5,308,300 A 5/1994 Chino et al.
5,322,491 A 6/1994 Wanzer et al.
5,336,143 A 8/1994 Wu
5,352,169 A 10/1994 Eschenbach
5,374,227 A 12/1994 Webb
5,383,829 A 1/1995 Miller
5,401,226 A * 3/1995 Stearns ..... 482/53
5,403,254 A 4/1995 Lundin et al.
RE34,959 E 5/1995 Potts
5,423,729 A 6/1995 Eschenbach
5,518,473 A 5/1996 Miller (Continued)

*Primary Examiner*—Stephen R. Crow
(74) *Attorney, Agent, or Firm*—Pillsbury Winthrop Shaw Pittman, LLP

(57) ABSTRACT

A combined cycling and stepping exerciser includes a base frame with an upright post, a drive wheel mounted on the base frame, a pair of elongated lever arms with front end portions pivoted to the upright post, a pair of slide seats, and pair of pedal arms disposed on the lever arms. Each of the lever arms has a longitudinal slide groove. Each of the slide seats is coupled to a respective crank arm of the drive wheel, and engages slidably the slide groove in a respective lever arm so as to be slidable along the slide groove. Each of the pedal members has a front end engaging slidably the slide groove in a respective lever arm. A pair of fasteners are operable for fastening rear ends of the pedal members selectively and respectively to the slide seats and to rear end portions of the lever arms.

21 Claims, 10 Drawing Sheets

U.S. PATENT DOCUMENTS 5,529,554 A 6/1996 Eschenbach
5,577,985 A 11/1996 Miller
5,653,662 A 8/1997 Rodgers, Jr.
5,669,856 A 9/1997 Liu
5,685,804 A 11/1997 Whan-Tong et al.
5,692,994 A 12/1997 Eschenbach
5,733,227 A 3/1998 Lee
5,735,774 A 4/1998 Maresh
5,741,205 A 4/1998 Doll et al.
5,746,683 A 5/1998 Lee
5,749,807 A 5/1998 Webb
5,755,642 A 5/1998 Miller
5,759,136 A 6/1998 Chen
5,769,760 A 6/1998 Lin et al.
5,779,599 A 7/1998 Chen
5,782,722 A 7/1998 Sands et al.
5,810,696 A 9/1998 Webb
5,848,954 A 12/1998 Stearns et al.
5,857,941 A 1/1999 Maresh et al.
5,895,339 A 4/1999 Maresh
5,916,065 A 6/1999 McBride et al.
5,935,046 A 8/1999 Maresh
5,938,568 A 8/1999 Maresh et al.
6,022,296 A 2/2000 Yu
6,045,487 A 4/2000 Miller
6,063,008 A 5/2000 McBride et al.
6,080,086 A 6/2000 Maresh et al.
6,126,574 A 10/2000 Stearns et al. ..... 482/52
6,135,923 A 10/2000 Stearns et al.
6,171,217 B1 1/2001 Cutler
6,179,752 B1 1/2001 Chang
6,183,398 B1 2/2001 Rufino et al. ..... 482/57
6,196,948 B1 * 3/2001 Stearns et al. ..... 482/52
6,206,804 B1 3/2001 Maresh
6,254,514 B1 7/2001 Maresh et al. ..... 482/52
6,277,056 B1 8/2001 McBride et al.
6,302,830 B1 * 10/2001 Stearns ..... 482/70
6,390,954 B1 5/2002 Lee
6,436,007 B1 8/2002 Eschenbach
6,629,909 B1 10/2003 Stearns et al.
2001/0051562 A1 12/2001 Stearns et al.
2002/0019298 A1 2/2002 Eschenbach
2002/0028731 A1 3/2002 Stearns et al.
2002/0077220 A1 6/2002 Kuo
2002/0094914 A1 7/2002 Maresh et al.
2002/0107112 A1 8/2002 Lim
2002/0165066 A1 11/2002 Stearns
2003/0045401 A1 3/2003 Watterson et al.
2003/0096676 A1 5/2003 Chen

* cited by examiner

COMBINED ELLIPTICAL CYCLING AND STEPPING EXERCISER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an exerciser, more particularly to an exerciser which provides combined cycling and stepping exercise functions and which is capable of being converted to operate in one of cycling and stepping exercise modes.

2. Description of the Related Art

FIG. 1 illustrates a conventional cycling exerciser 10 which mainly includes a base frame 11 mounted with a resistance wheel 12 that is coupled to a drive wheel 13 for providing resistance to rotation of the drive wheel 13. The drive wheel 13 has a pair of crank arms 14 on opposite lateral sides thereof. The base frame 11 has an upright post 15 at a front end thereof. A pair of horizontal pivot shafts 16 project laterally from the upright post 15, and are connected pivotally to a pair of upright linking rods 17 which have lower ends connected pivotally to front ends of a pair of pedals 18 that are disposed on opposite lateral sides of the base frame 11. The pedals 18 are coupled to the crank arms 14, respectively, for propelling rotation of the drive wheel 13. However, the exerciser 10 can only perform a regular cycling exercise mode, and only exercises the knees and the ankles of the user.

*The prior art exerciser shown in FIG. 1 is disclosed in the FIG. 4 embodiment of U.S. Pat. No. 5,383,829, issued Jan. 24, 1995 (see also Reexamination Certificate issued Mar. 5, 2002). The '829 patent as reexamined describes the dual crank arm mechanism for mounting of the foot links or pedal members (pedals 18 of FIG. 1 herein) which achieves the elliptical movement that is such as "to direct a second end of each foot link along a preselected, reciprocating path of travel as the first end of said foot link travels along said arcuate path; so that when said exercise device is in use, and when the second end of one of said foot links travels from a point at a rearward end of said reciprocating path, forward along said path, the heel portion of a user's foot associated therewith initially rises at a faster rate than the toe portion, and when the second end of said foot link travels rearward along said reciprocating path of travel from a forward end thereof, the heel portion of the user's foot initially lowers at a faster rate than the toe portion."*

*The same inventor of the '829 patent was granted a related U.S. Pat. No. 5,518,473, issued May 21, 1996, which uses the same language to describe the elliptical movement of the foot links or pedal members of the disclosed elliptical exerciser which has a different mounting arrangement for the second end of the foot links or pedal members. In the '473 patent exerciser, the connection of the second end of each foot link or pedal member directs it along a closed curved path rather than a reciprocating path. It is to be appreciated that the term "cycling" as used herein refers to an "elliptical cycling" or "elliptical" mode of operation as identified in the '829 and '473 patents noted above.*

SUMMARY OF THE INVENTION

The main object of the present invention is to provide a combined cycling and stepping exerciser which provides combined cycling and stepping exercise functions and which is capable of being converted to operate in one of cycling and stepping exercise modes.

Accordingly, the exerciser of the present invention includes a base frame, a drive wheel, a pair of elongated lever arms, a pair of slide seats, a pair of pedal arms and fasteners. The base frame has a front end portion with an upright post, and a rear end portion opposite to the front end portion in a longitudinal direction. The upright post is formed with a pair of horizontal pivot shafts that project in opposite lateral directions transverse to the longitudinal direction. The drive wheel is mounted rotatably on the rear end portion of the base frame. The drive wheel has a horizontal wheel axle transverse to the longitudinal direction, and a pair of crank arms coupled to the wheel axle and disposed on opposite lateral sides of the drive wheel. The elongated lever arms are disposed on opposite lateral sides of the base frame. Each of the lever arms has a front end portion pivoted to a respective one of the pivot shafts on the upright post, a rear end portion, and a longitudinally extending slide groove extending between the front and rear end portions. Each of the slide seats is coupled to a respective one of the crank arms, and engages slidably the slide groove in a respective one of the lever arms so as to be slidable along the slide groove when the drive wheel rotates. The pedal members are disposed respectively on the lever arms. Each of the pedal members has a front end engaging slidably the slide groove in the respective one of the lever arms, and a rear end. The fasteners are operable for fastening the rear ends of the pedal members selectively and respectively to the slide seats and to the rear end portions of the lever arms.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
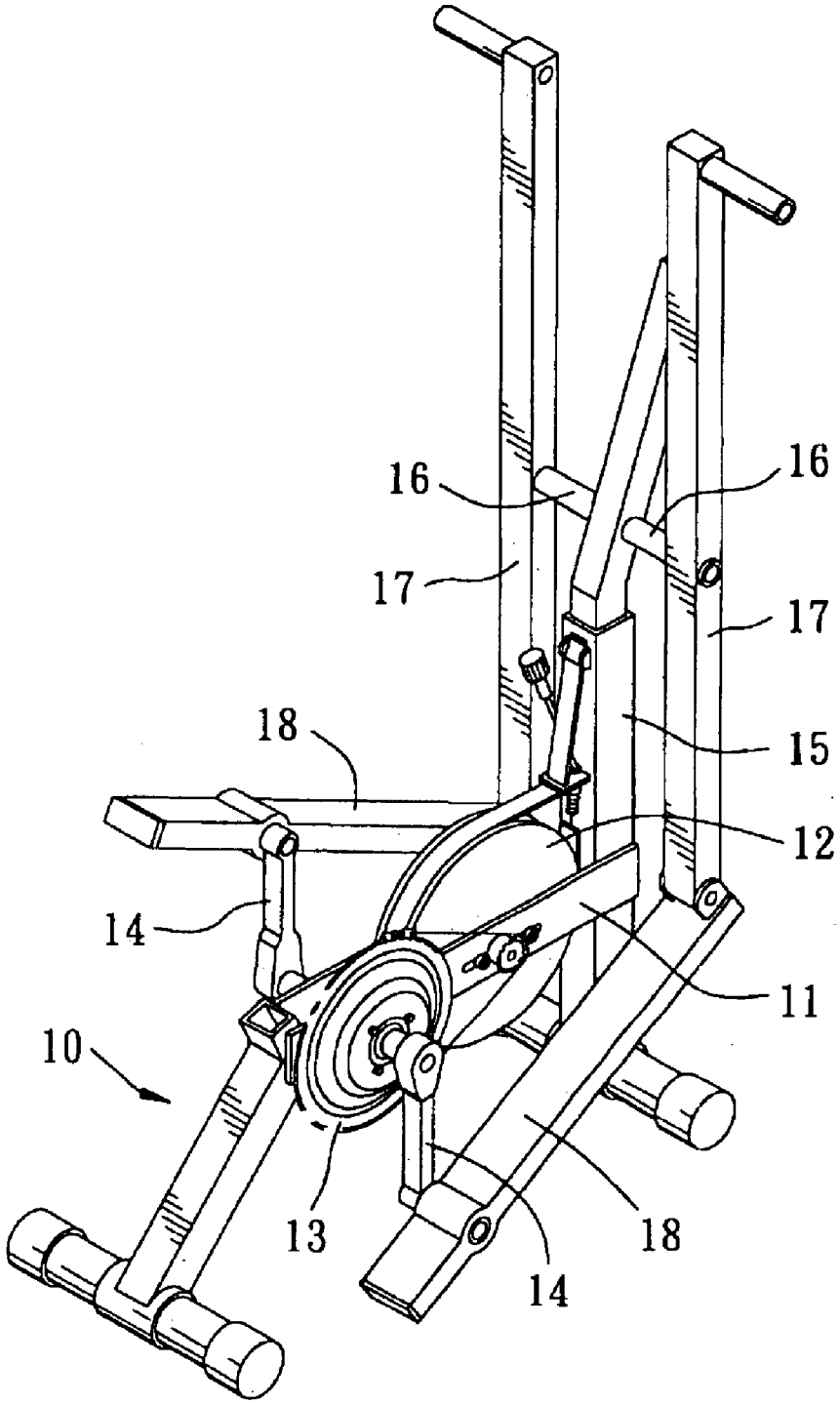
FIG. 1 PRIOR ART
FIG. 1 is a perspective view of a conventional cycling exerciser.
Figure 2:
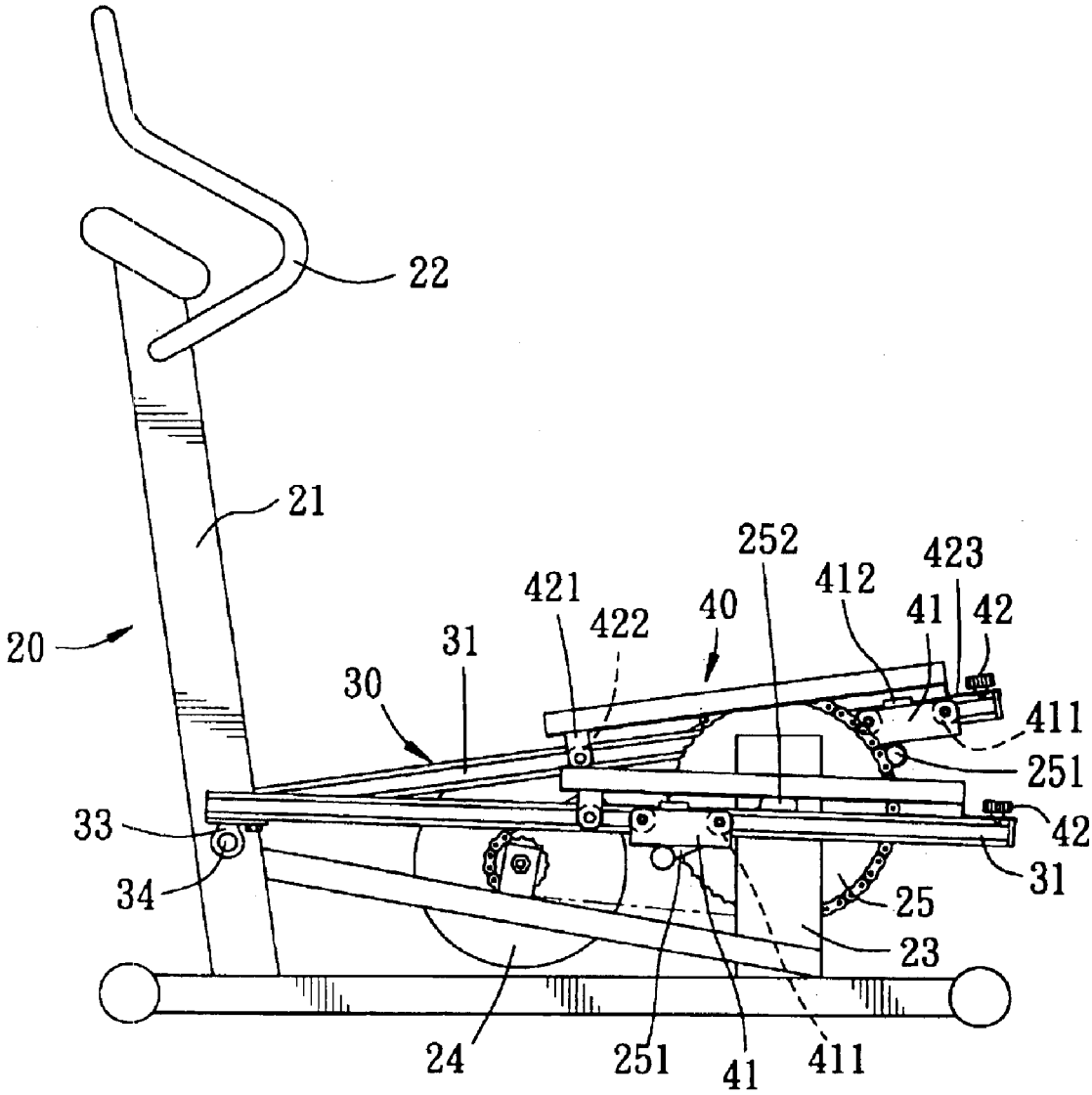
FIG. 2 is a side view of a preferred embodiment of the combined cycling and stepping exerciser of the present invention.

Referring to FIG. 2, the preferred embodiment of the combined cycling and stepping exerciser of the present invention is shown to include a base frame 20, a drive wheel 25, a resistance wheel 24, a pair of lever arms 30, a pair of slide seats 41 *or motion transmitting members*, a pair of pedal members 40 *with respective foot engaging portions and opposite ends*, and a pair of operable fasteners 42.

The base frame 20 has a front end portion formed with an upright front post 21, and a rear end portion opposite to the front end portion in a longitudinal direction and formed with an upright rear post 23. A pair of handle members 22 are secured to an upper end portion of the front post 21. A pair of horizontal pivot shafts 23 (see FIG. 5) *or pivot members* project from a lower end portion of the front post 21 in opposite lateral directions. The drive wheel 25 is mounted rotatably on the rear post 23, and is coupled to the resistance wheel 24, which is mounted on the base frame 20. The resistance wheel 24 provides resistance to rotation of the drive wheel 25 in a known manner. The drive wheel 25 has a horizontal wheel axle 252 which extends in a direction transverse to the longitudinal direction and which has a pair of crank arms 251 disposed on opposite lateral sides of the drive wheel 25.

Figure 4:
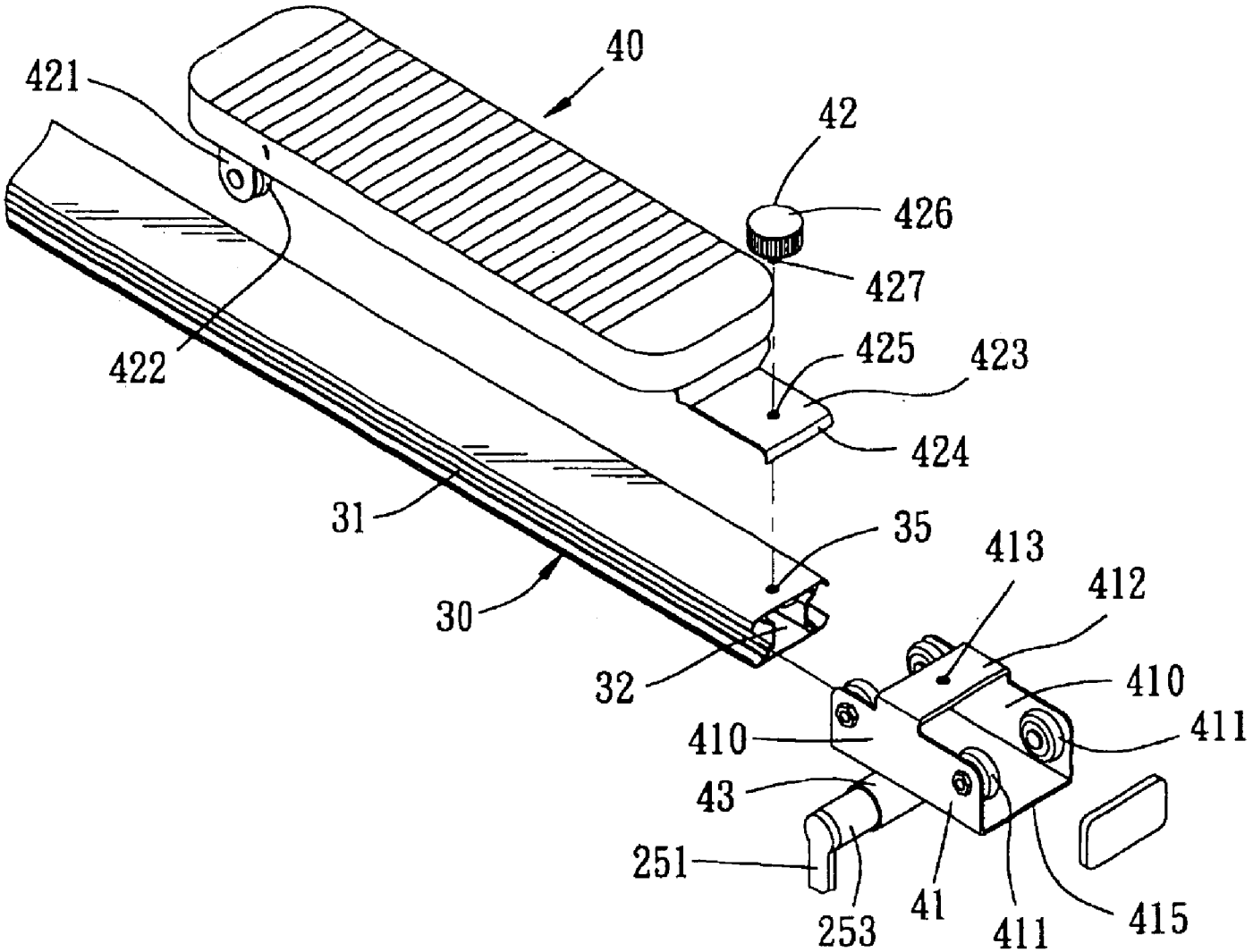
FIG. 4 is a fragmentary exploded perspective view of the present invention.
Figure 5:
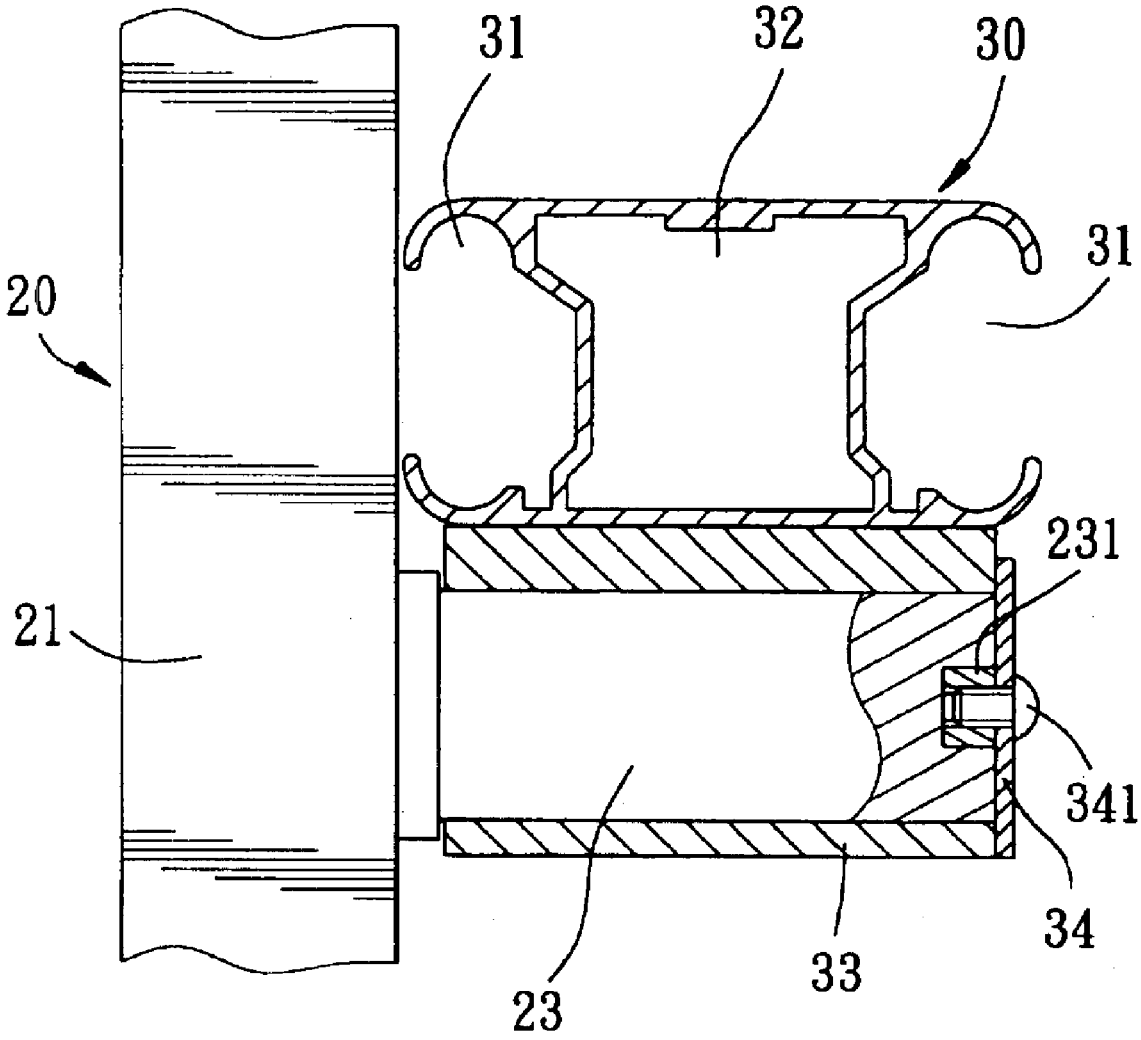
FIG. 5 is a fragmentary sectional view of the preferred embodiment, illustrating how a front post is connected to a lever arm.

Referring to FIGS. 2 and 5, the lever arms 30 are disposed on opposite lateral sides of the base frame 20. Each of the lever arms 30 has a front end portion formed with a coupling sleeve 33 on its bottom side for coupling rotatably with a respective one of the pivot shafts 23 on the front post 21. The respective one of the pivot shafts 23 is retained in the coupling sleeve 33 by means of an end plate 34 and a screw 341 that fastens the end plate 34 to a nut 231 buried securely in one end of the pivot shaft 23. For the sake of reduction in weight, each of the lever arms 30 is formed as an elongated hollow body with a pair of longitudinally extending slide grooves 31 formed in two opposite lateral sides thereof, and an intermediate cavity 32 disposed between the slide grooves 31. Each of the lever arms 30 further has a rear end portion formed with an internally threaded first fastener hole 35 (see FIG. 4).

Figure 6:
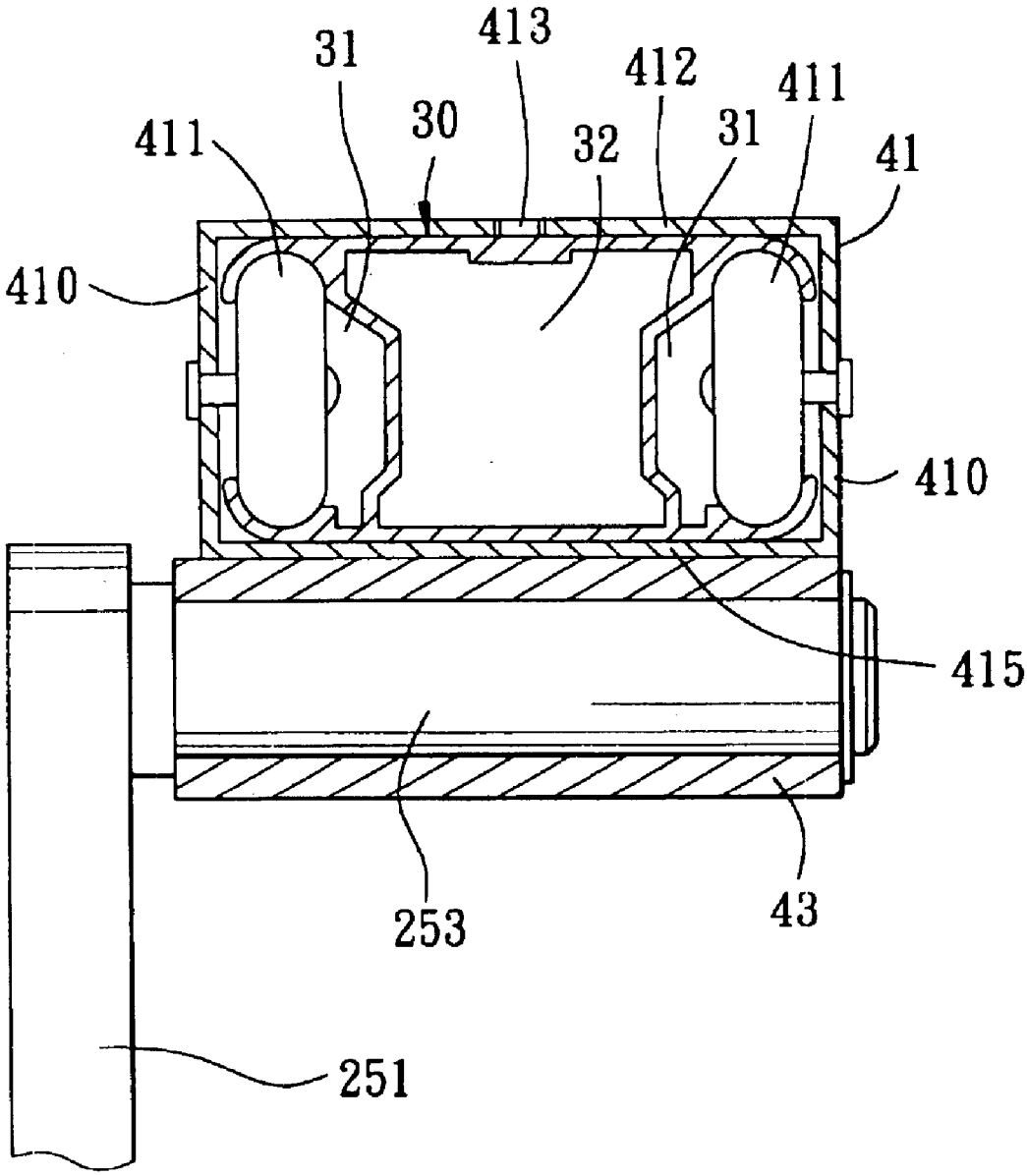
FIG. 6 is another fragmentary sectional view of the preferred embodiment, illustrating how a slide seat is mounted on a lever arm.

Referring to FIGS. 4 and 6, each of the slide seats 41 includes a casing which is disposed around a respective one of the lever arms 30 and which has left and right side walls 410 disposed on opposite lateral sides of the respective one of the lever arms 30, a top wall 412 interconnecting the side walls 410 and disposed over the respective one of the lever arms 30, and a bottom wall 415 interconnecting the side walls 410 and disposed below the respective one of the lever arms 30. The side walls 410 have confronting inner side surfaces, each of which is provided with two rollers 411 which extend into a respective one of the slide grooves 31 in the respective one of the lever arms 30 such that the slide seat 41 is slidable on the respective one of the lever arms 30 along the slide grooves 31. The top wall 412 is formed with an internally threaded second fastener hole 413. The bottom wall 415 has a bottom side provided with a coupling sleeve 43 which extends in a horizontal direction transverse to the longitudinal direction and which is sleeved on a transverse coupling shaft 253 at a distal end of a respective one of the crank arms 251.

Figure 3:
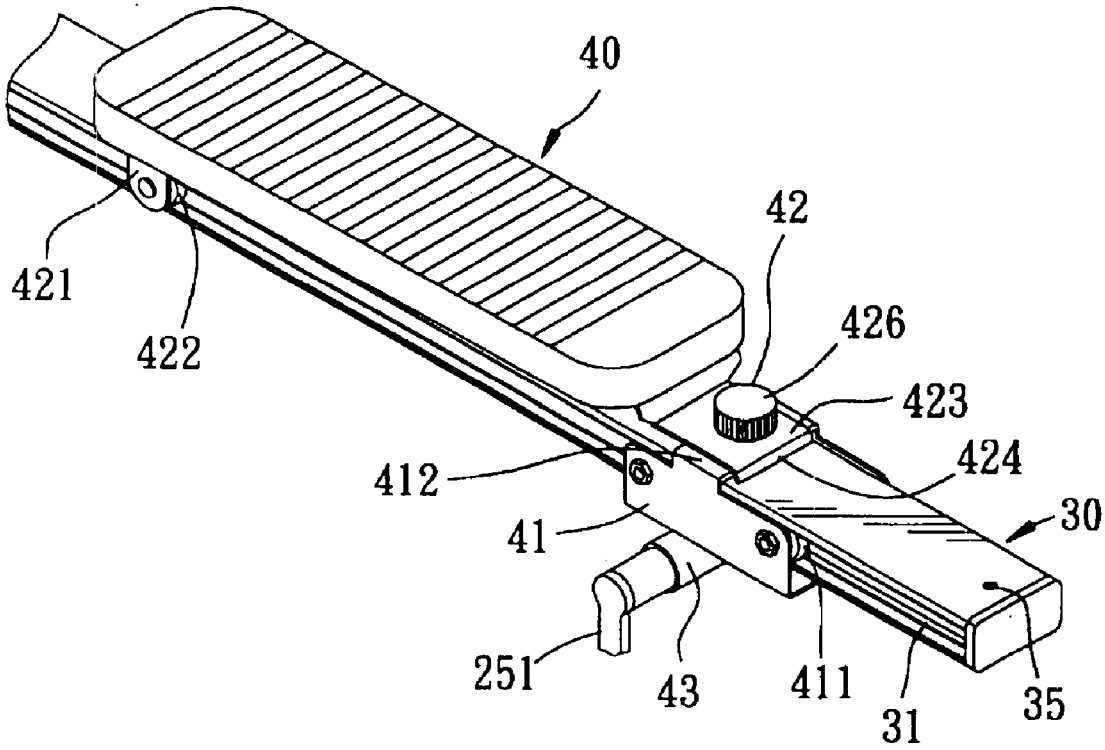
FIG. 3 is a fragmentary perspective view of the preferred embodiment, where a pedal member is shown to be fastened to a slide seat.

Referring to FIGS. 3 and 4, each of the pedal members 40 is disposed over a respective one of the lever arms 30, and has a front end formed with a pair of mounting lobes 421 which extend downwardly to the lateral sides of the respective one of the lever arms 30 and which are provided with rollers 422 that extend respectively into the slide grooves 31 in the respective one of the lever arms 30. Each of the pedal members 40 further has a rear end formed with a horizontal mounting plate 423 which has a mounting hole 425 formed therethrough and a downward flange 424 formed at a rear edge thereof.

Each of the fasteners 42 includes an operating knob 426 disposed over the mounting plate 423 of a respective one of the pedal members 40, and a threaded shank 427 extending through the mounting hole 425 in the mounting plate 423. In one exercise mode, the threaded shanks 427 of the fasteners 42 are fastened to the first fastener holes 35 for fastening the rear ends of the pedal members 40 to the lever arms 30. In another exercise mode, the threaded shanks 427 engage the second fastener holes 413 for fastening the rear ends of the pedal members 40 to the slide seats 41.

Figure 7:
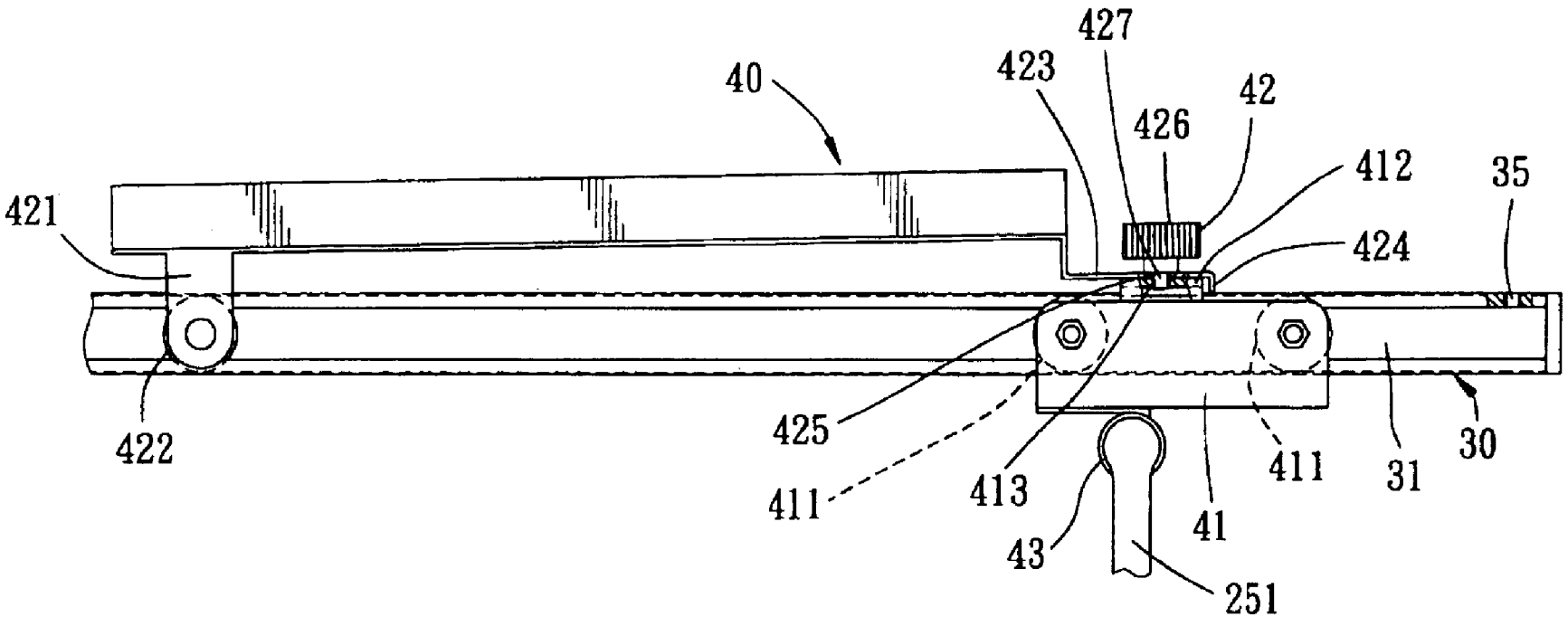
FIG. 7 is a fragmentary side view, illustrating the preferred embodiment when the pedal members are fastened to the slide seats.
Figure 9:
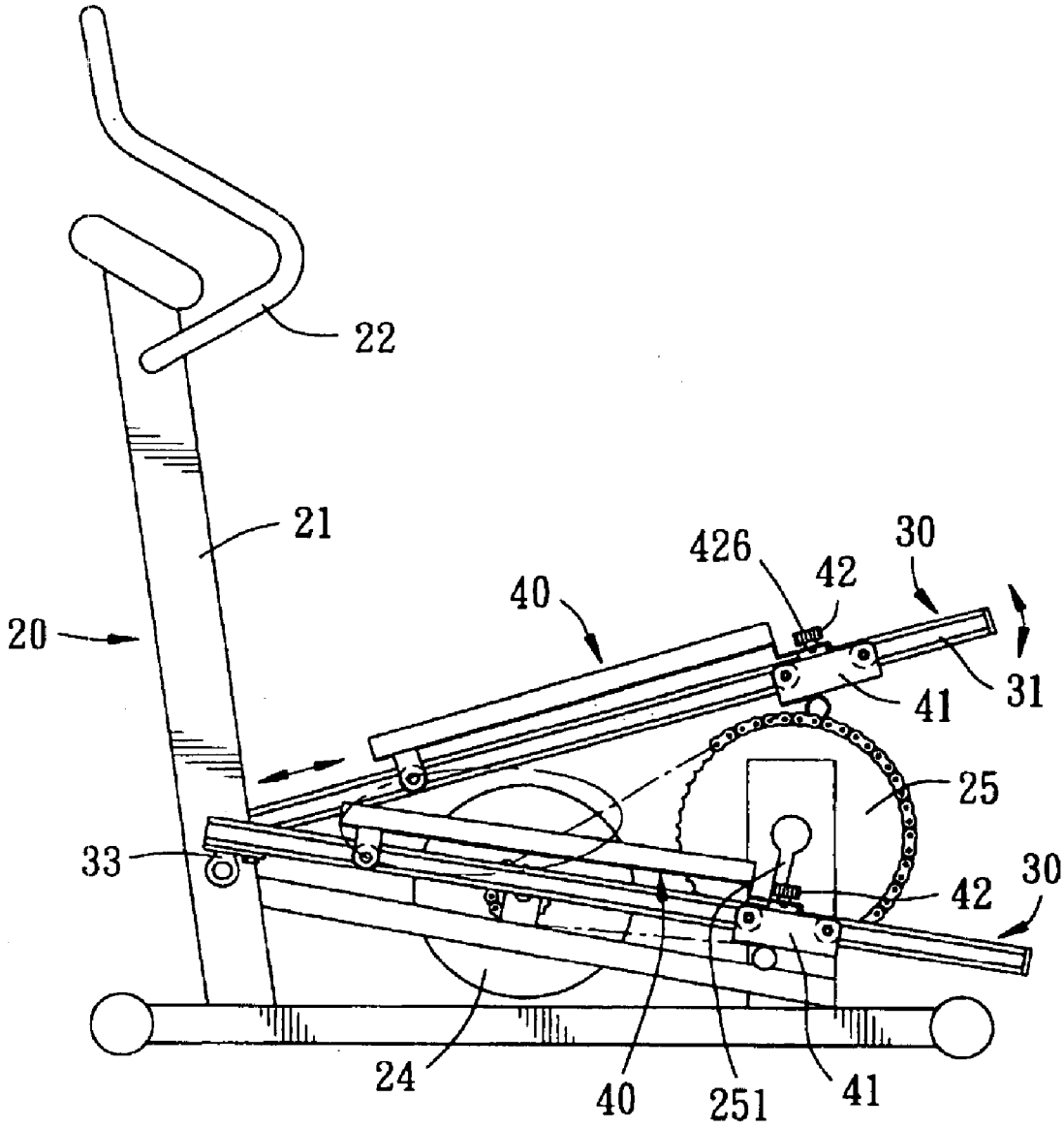
FIG. 9 is a side view illustrating the preferred embodiment when operated to perform a cycling exercise mode.

Referring to FIGS. 7 and 9, when it is desired to perform the cycling exercise mode with the use of the exerciser of the present embodiment, the downward flanges 424 on the mounting plates 423 are hooked to rear edges of the top walls 412 of the slide seats 41, and the threaded shanks 427 of the fasteners 42 are threaded into the second fastener holes 413 in the top walls 412 of the slide seats 41 for fastening the rear ends of the pedal members 40 to the slide seats 41. Since the slide seats 41 engage slidably the slide grooves 31 in the lever arms 30 and are coupled to the crank arms 251 of the drive wheel 25, and since the front ends of the pedal members 40 engage slidably the lever arms 30 by virfue of the rollers 422, the pedal members 40 are slidable on the lever arms 30 along circulating routes of the crank arms 251 when the user steps on the pedal member 40 to cause upward and downward pivoting movements of the lever arms 30.

*As is evident from the drawings, opposite ends of the foot links or pedal members 40 move along closed curved and arcuate paths respectively, and the elliptical movement of the foot links or pedal members 40 in use is the same as described above in the '829 and '473 prior art patents. The closed curved path is one in which the rearward movement of one end portion of each pedal member 40 is along one curved path sector and the forward movement is along a different curved path sector. The arcuate path is one which can be more accurately described as a circular orbital path.*

Figure 8:
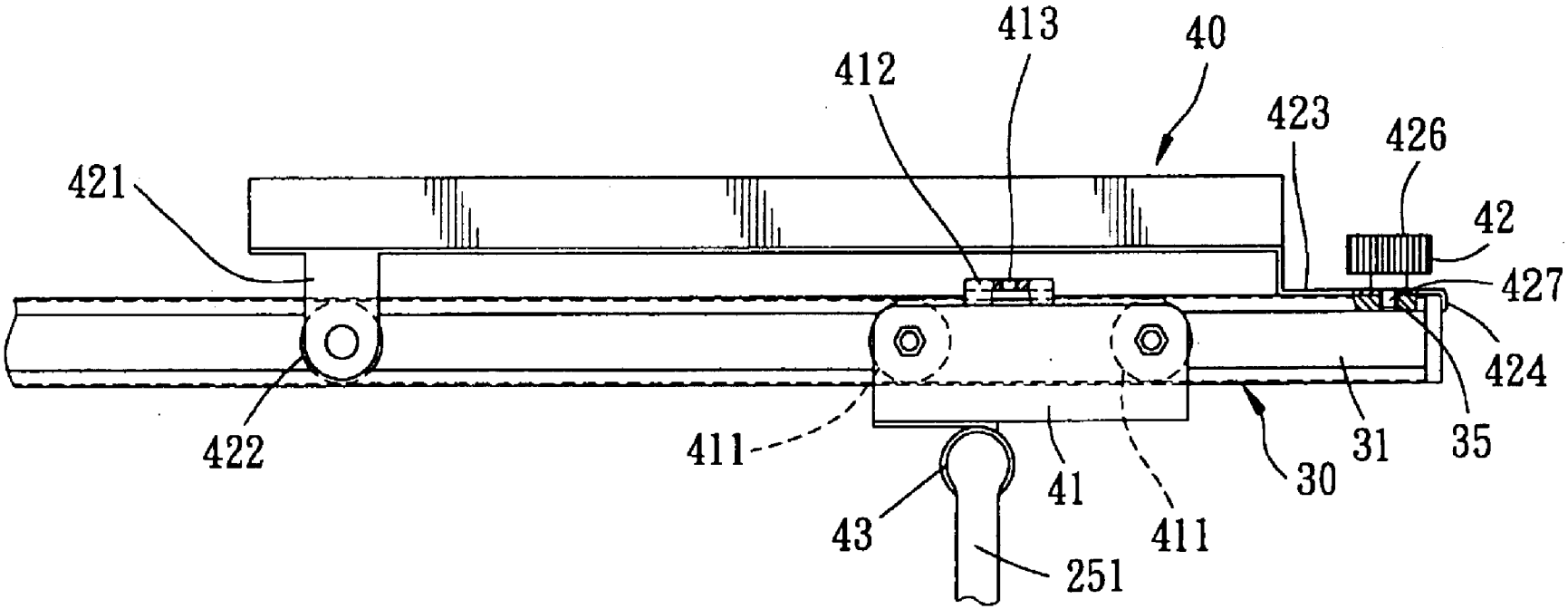
FIG. 8 is a fragmentary side view, illustrating the preferred embodiment when the pedal members are fastened to the lever arms.
Figure 10:
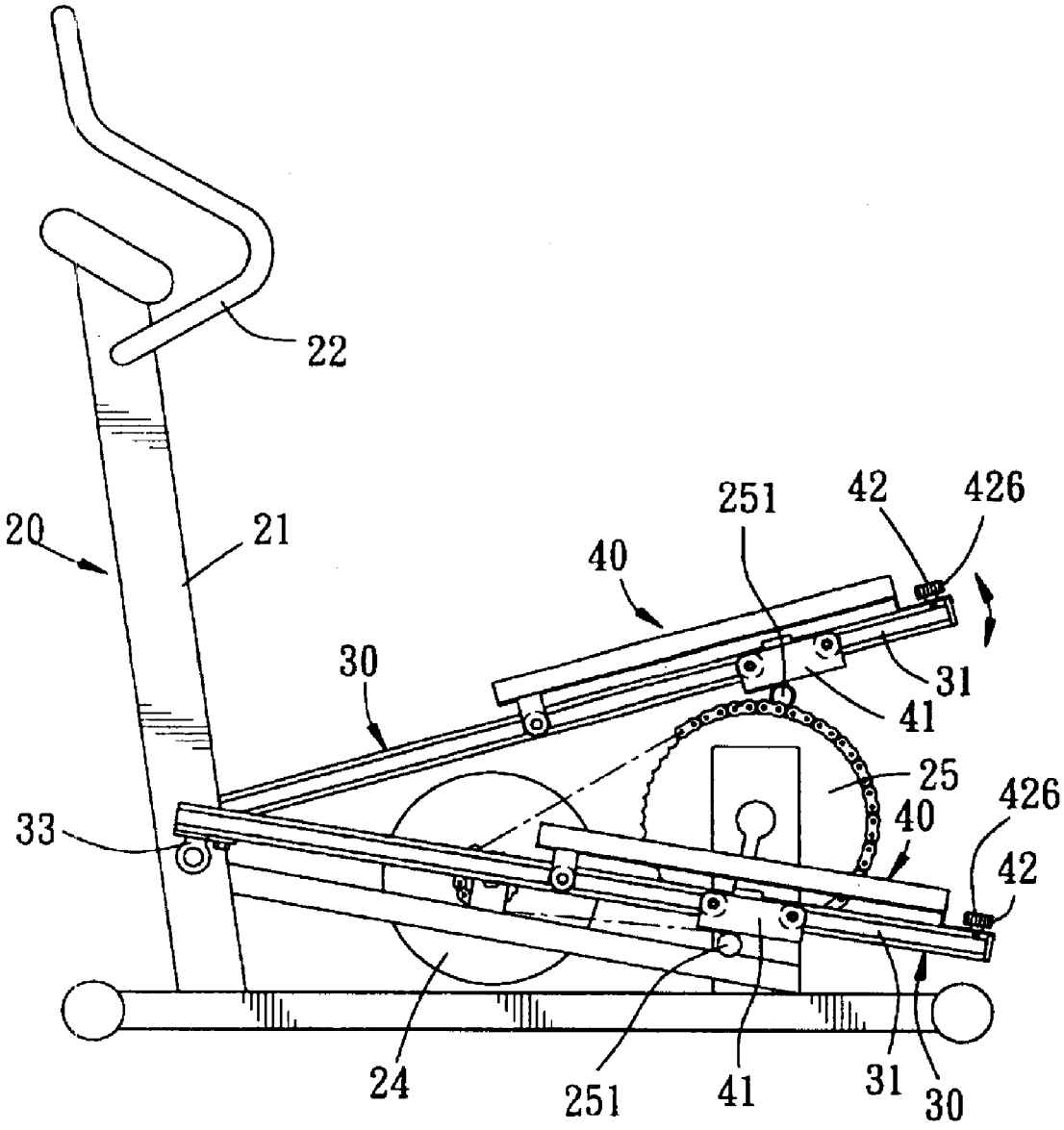
FIG. 10 is a side view illustrating the preferred embodiment when operated to perform a stepping exercise mode.

Referring to FIGS. 8 and 10, when it is desired to perform a stepping exercise mode, the downward flanges 424 on the mounting plates 423 are hooked to rear edges of the rear end portions of the lever arms 30, and the threaded shanks 427 of the fasteners 42 are threaded into the first fastener holes 35 in the rear end portions of the lever arms 30 for fastening the pedal members 40 to the lever arms 30. The slide seats 41 are sleeved slidably on the lever arms 30, and are disposed between the front and rear ends of the pedal members 40. Since the slide seats 41 are coupled to the crank arms 251 and engage slidably the lever arms 30, when the user steps on the pedal members 40, the lever arms 30 pivot upwardly and downwardly together with the pedal members 40 to cause the slide seats 41 to slide along the lever arms 30, thereby driving movement of the crank arms 251 and thereby propelling rotation of the drive wheel 25.

*As is evident from the drawings, the pedal members 40 move in arcuate paths between uppermost and lowermost arcuate positions. The arcuate paths are equidistant from the fixed pivotal axis provided on the frame 20 by way of the pivot shafts 23, so that when the exerciser is in use in the stepping exercise mode, one foot of the user will move upwardly between the arcuate positions while the other foot moves downwardly between the arcuate positions.*

It has thus been shown that the exerciser of the present invention incorporates two different exercise functions in a single apparatus. Conversion from one exercise mode to another can be easily accomplished by operating the fasteners 42 for fastening the pedal members 40 selectively to the lever arms 30 and to the slide seats 41, as desired.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A combined cycling and stepping exerciser comprising:

a base frame having a front end portion with an upright post, and a rear end portion opposite to said front end portion in a longitudinal direction, said upright post being formed with a pair of horizontal pivot shafts that project in opposite lateral direction transverse to the longitudinal direction;

a drive wheel mounted rotatably on said rear end portion of said base frame, said drive wheel having a horizontal wheel axle transverse to said longitudinal direction, and a pair of crank arms coupled to said wheel axle and disposed on opposite lateral sides of said drive wheel;

a pair of elongated lever arms disposed on opposite lateral sides of said base frame, each of said lever arms having a front end portion pivoted to a respective one of said pivot shafts on said upright post, a rear end portion, and a longitudinally extending slide groove extending between said front and rear end portions;

a pair of slide seats, each of which is coupled to a respective one of said crank arms and engages slidably said slide groove in a respective one of said lever arms so as to be slidable along said slide groove when said drive wheel rotates;

a pair of pedal members disposed respectively on said lever arms, each of said pedal members having a front end engaging slidably said slide groove in the respective one of said lever arms, and a rear end; and fasteners which are operable for fastening said rear ends of said pedal members selectively and respectively to said slide seats and to said rear end portions of said lever arms.

2. The combined cycling and stepping exerciser as claimed in claim 1, further comprising a resistance wheel mounted rotatably on said base frame and coupled to said drive wheel for providing resistance to rotation of said drive wheel.

3. The combined cycling and stepping exerciser as claimed in claim 1, wherein each of said lever arms is formed with two of said slide grooves in opposite lateral sides thereof.

4. The combined cycling and stepping exerciser as claimed in claim 3, wherein said front end of each of said pedal members has a pair of mounting lobes which extend downwardly to said lateral sides of the respective one of said lever arms, each of said mounting lobes being provided with a roller which extends into a respective one of said slide grooves in the respective one of said lever arms.

5. The combined cycling and stepping exerciser as claimed in claim 3, wherein each of said slide seats is sleeved on the respective one of said lever arms and has a pair of side walls disposed respectively on the opposite lateral sides of the respective one of said lever arms, said side walls having confronting inner side surfaces, each of which is provided with at least one roller that extends into a respective one of said slide grooves in the respective one of said lever arms.

6. The combining cycling and stepping exerciser as claimed in claim 5, wherein said rear end of each of said pedal members has a horizontal mounting plate which is formed with a mounting hole for mounting a respective one of said fasteners therein, each of said fasteners having an operating knob disposed over said mounting plate of a respective one of said pedal members, and a threaded shank extending through said mounting hole in said mounting plate, each of said slide seats further having a top wall interconnecting said side walls and disposed over the respective one of said lever arms, said top wall being formed with an internally threaded fastener hole for engaging threadedly said threaded shank of a respective one of said fasteners when said rear ends of said pedal members are fastened to said slide seat, said rear end portion of each of said lever arms being formed with an internally threaded fastener hole on a top side of said lever arm for engaging threadedly said threaded shank of a respective one of said fasteners when said rear ends of said pedal members are fastened to said rear end portions of said lever arms.

7. The combined cycling and stepping exerciser as claimed in claim 6, wherein said top wall of each of said slide seats has a rear edge, said rear end portion of each of said lever arms having a rear edge, said mounting plate of each of said pedal members being formed with a downward flange for engaging said rear edge of said top wall of the respective one of said slide seats when said mounting plate is fastened to the respective one of said slide seats, and for engaging said rear edge of said rear end portion of the respective one of said lever arms when said mounting plate is fastened to said rear end portion of the respective one of said lever arms.

8. The combined cycling and stepping exerciser as claimed in claim 6, wherein each of said slide seats further has a bottom wall disposed below the respective one of said lever arms and interconnecting said side walls, said bottom wall having a bottom side provided with a coupling sleeve that extends in a horizontal direction transverse to said longitudinal direction and that is coupled to a distal end of a respective one of said crank arms.

*9. A combined elliptical cycling and stepping exerciser, comprising:*

*a frame configured to be supported on a horizontal surface; and*

*a dual crank arm mechanism including left and right pedal members,*

*each of said left and right pedal members having a foot engaging portion configured to support a foot of a user and opposite end portions,*

*said dual crank arm mechanism being constructed and arranged with respect to the pedal members so that the pedal members can be selectively moved in either an elliptical cycling mode or a stepping mode,*

*each of said pedal members, when in the elliptical cycling mode, being operatively associated with said dual crank arm mechanism so that one end portion thereof moves along a preselected path while the opposite end portion thereof moves in a circular orbital path about a fixed transverse rotational axis provided on said frame, so that when the exerciser is in use in said elliptical cycling mode, and when a foot of the user which is disposed upon the foot engaging portion*

*thereof travels forwardly from a rearwardmost position, the heel portion of the user's foot associated therewith initially rises at a faster rate than the toe portion, and when the foot travels rearwardly from a forwardmost position, the heel portion of the user's foot initially lowers at a faster rate than the toe portion,*

*each of said pedal members, when in the stepping mode, being operatively associated with said dual crank arm mechanism so that the foot engaging portions thereof move in arcuate paths between uppermost and lowermost arcuate positions, which arcuate paths are equidistant from a fixed pivotal axis provided on said frame, so that when the exerciser is in use in said stepping mode, one foot of the user will move upwardly between said arcuate positions while the other foot moves downwardly between said arcuate positions.*

*10. The exerciser of claim 9, wherein said dual crank arm mechanism includes a horizontal axle rotatably mounted on the frame for rotation about the rotational axis provided thereon, and left and right crank arms fixed on opposite lateral sides of said horizontal axle.*

*11. The exerciser of claim 10, wherein a drive wheel is fixed with respect to said horizontal axle between said left and right crank arms and a resistance wheel is mounted rotatably on a second rotational axis parallel to said first mentioned rotational axis provided on said frame, said resistance wheel being coupled to said drive wheel for providing resistance to the rotation of said drive wheel.*

*12. The exerciser of claim 10, wherein said dual crank arm mechanism includes left and right motion transmitting members rotationally connected to free ends of the left and right crank arms respectively, said left and right motion transmitting members being selectively connected with respect to said left and right pedal members respectively so that in the elliptical mode thereof, the left and right motion transmitting members move with the left and right pedal members respectively, and in the stepping mode thereof, the left and right motion transmitting members slide with respect to the left and right pedal members respectively.*

*13. The exerciser of claim 12, wherein said dual crank arm mechanism includes left and right horizontally extending pivot members on said frame that provide the pivotal axis for the movement of said left and right pedal members when said pedal members are in said stepping mode.*

*14. The exerciser of claim 13, wherein said pivot members constitute pivot shafts fixed to and extending from a vertically extending post of said frame.*

*15. The exerciser of claim 13, wherein said dual crank arm mechanism includes left and right elongated lever arms each having a front end portion pivoted to said left and right pivot members respectively, a rear end portion, and a longitudinally extending slide groove extending between said front and rear end portions, said left and right pedal members being disposed on said left and right lever arms respectively, each of said pedal members having a front end portion engaging slidably said slide groove in the respective one of said lever arms, and a rear end, said dual crank arm mechanism further including left and right fasteners which are operable for fastening said rear ends of said left and right pedal members selectively to said left and right motion transmitting members respectively when said left and right pedal members are in said elliptical cycling mode or selectively to said rear end portions of said left and right lever arms when said left and right pedal members are in said stepping mode.*

*16. The exerciser of claim 15, wherein each said front end portion of each of said pedal members engages slidably said slide groove by rolling on a surface defining the groove.*

*17. The exerciser of claim 13, wherein said pre-selected path comprises a closed curved shaped path so that the rearward movement of the one end portion of each pedal member is along one curved path sector and the forward movement is along a different curved path sector.*

*18. The exerciser of claim 9, wherein said pre-selected path comprises a closed curved shaped path so that the rearward movement of the one end portion of each pedal member is along one curved path sector and the forward movement is along a different curved path sector.*

*19. A dual mode exerciser, comprising:*

*a frame configured to be supported on a horizontal surface; and*

*a dual crank arm mechanism including left and right pedal members,*

*each of said left and right pedal members having a foot engaging portion configured to support a foot of a user,*

*said dual crank arm mechanism being selectively operable in a first mode or a second mode, wherein*

*when said dual crank arm mechanism is operating in said first mode, the foot engaging portion of each of said pedal members moves in a generally elliptical closed loop path, and*

*when said dual crank arm mechanism is operating in said second mode, the foot engaging portion of each of said pedal members moves in a generally up-and-down reciprocal arcuate path.*

*20. The exerciser of claim 19, wherein when said dual crank arm mechanism is operating in said first mode, one end portion of each pedal member moves along a preselected path while the opposite end portion thereof moves in a circular orbital path about a fixed transverse rotational axis provided on said frame.*

*21. The exerciser of claim 19, wherein when said dual crank arm mechanism is operating in said second mode, the foot engaging portions of each of said pedal members move in arcuate paths between uppermost and lowermost arcuate positions, which arcuate paths are equidistant from a fixed pivotal axis provided on said frame.*

* * * * *